W. M. FULTON.
TEMPERATURE REGULATOR.
APPLICATION FILED AUG. 25, 1916.

1,358,723.

Patented Nov. 16, 1920.
2 SHEETS—SHEET 1.

Inventor
Weston M. Fulton
By
Mauro, Cameron, Lewis & Massie
Attorneys

UNITED STATES PATENT OFFICE.

WESTON M. FULTON, OF KNOXVILLE, TENNESSEE, ASSIGNOR TO THE FULTON COMPANY, OF KNOXVILLE, TENNESSEE, A CORPORATION OF MAINE.

TEMPERATURE-REGULATOR.

1,358,723.    Specification of Letters Patent.    Patented Nov. 16, 1920.

Application filed August 25, 1916. Serial No. 116,841.

*To all whom it may concern:*

Be it known that I, WESTON M. FULTON, a citizen of the United States of America, and a resident of Knoxville, Tennessee, have invented a new and useful Improvement in Temperature-Regulators, which invention is fully set forth in the following specification.

This invention relates to thermostatic apparatus for operating a means to be controlled, and especially to apparatus of this type when employed as a temperature regulator, and it has for an object to provide a device of this character which, while capable of a wide variety of uses, is particularly useful when applied to the control of the heating effect of a radiator.

A further object of this invention is to provide a device of the type characterized which is very sensitive to temperature changes. Yet another object is to provide a regulator that utilizes the power of one thermosensitive means to move a second thermosensitive means with respect to a source of heat, controlling the source of heat or other means to be controlled from the second thermosensitve means, whereby, upon the principle of the relay, an increased power for operating the controlling means may be secured. Other objects relate to the provision of a regulator that is compact, easily installed, inexpensive to manufacture, and efficient in operation.

Stated briefly, the invention comprises, in combination with a source of heat, a secondary thermosensitive means mounted for movement with respect to the source of heat, and a primary, preferably temperature-responsive or thermosensitive, means for moving such secondary thermosensitive means with respect to the source of heat, utilizing said secondary thermosensitive means as the source of power for operating a controlling means, such as a controlling means for the source of heat. Said source of heat may desirably be a radiator, and the controlling means may be means for regulating the heating effect of said radiator as, for example, a damper in a housing for the radiator.

The invention is capable of receiving a variety of mechanical expressions, two of which, for the purpose of illustration, have been shown on the accompanying drawings. But it is to be expressly understood that these embodiments have been selected for the purpose of illustration only, and are not to be construed as a definition of the limits of the invention, reference being had to the appended claims for that purpose.

Referring to the drawings, wherein the same reference characters designate corresponding parts in the several figures, Figure 1 is an elevation, partly in section, of an embodiment of the invention applied to the control of the damper of a radiator housing;

Figure 1:
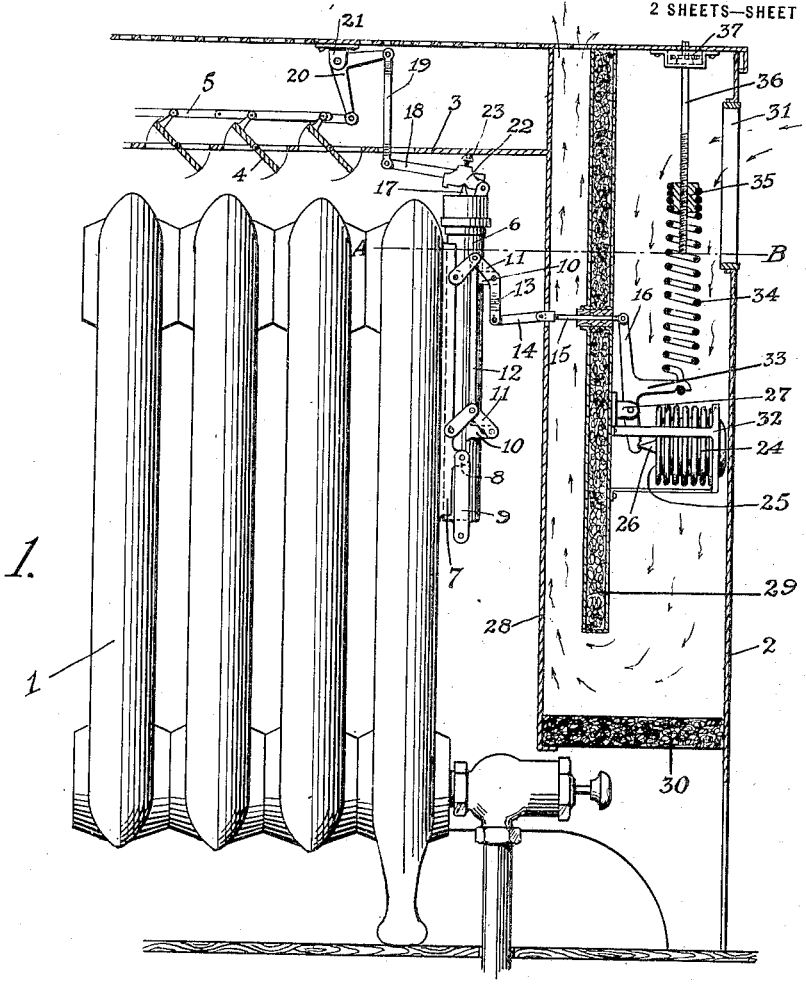
Figure 2:
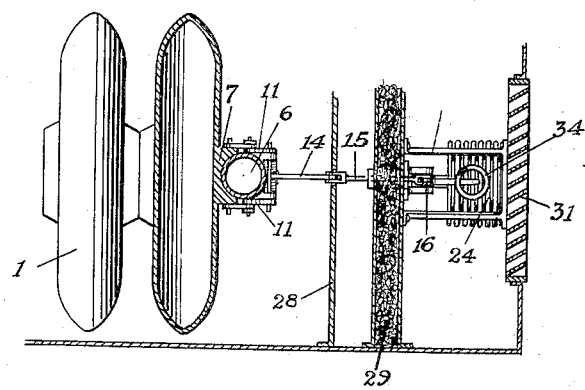
Fig. 2 is a horizontal section on the line A—B of Fig. 1.

Referring in detail to Figs. 1 and 2, 1 represents a source of heat, shown as a radiator of any preferred type and employing any desired heating medium. 2 represents a housing for the radiator provided, as in the top thereof, with apertures for the exit of heated air. In the form shown a partition 3 is positioned within the housing 2 and provided with apertures controlled by any suitable form of damper, illustrated as a plurality of shutters 4 pivotally mounted to open and close the apertures in the partition 3, the said shutters 4 being, in turn, pivotally connected to an operating bar 5.

Thermosensitive means are provided for controlling the aforesaid damper and, in accordance with the present invention, this thermosensitive means comprises a secondary thermostat mounted for movement with respect to the radiator, whereby it may be made to move relatively thereto in order to come more or less under the influence of the heat of said radiator. Any suitable form of thermostat may be employed. In the embodiment illustrated a thermostat of the general type disclosed in my Patent No. 1,153,214, granted September 14, 1915, is represented at 6. Any suitable means may be employed for so mounting this secondary thermostat 6 that it may be moved relatively thereto, preferably by bodily movement toward and away from the radiator. The illustrated construction comprises a supporting member 7 shown as carried by the radiator and desirably cast integral with the adjacent section of the radiator, said supporting member preferably being made trough-like to conform in its concave outline with the exterior surface of the thermostat 6, so that the latter may have an extended contact with such supporting member in its extreme position of movement toward the radiator. In the form shown, the lower end of the thermostat is swung from a lug 8 on the supporting member 7 by a link 9. The housing of the thermostat is also provided with a pair of lateral lugs 10, and two toggles 11 are pivotally mounted on said lugs 10 and the supporting member 7 with their elements in parallel relation, a link 12 being shown for maintaining such parallel relationship. One of the elements of one of the toggles is extended to provide an operating crank-arm, as illustrated at 13, and is connected by links 14 and 15 to an operating member 16 to be hereafter described. A stem 17 connected to the movable member of the thermostat is operatively connected to the bar 5, as by the operating arm 18, link 19, and bell-crank 20 pivotally mounted on a bracket 21 secured to a wall of the housing. The operating arm 18 may desirably be made adjustable with respect to the stem 17 by providing a sliding connection between said arm 18 and the rocker member 22 with which said stem is shown as engaging, a set-screw 23 being employed to maintain the parts in adjusted relationship.

A primary means, preferably a thermostat of any suitable construction, is provided for moving the aforesaid secondary thermostat with respect to the radiator. In the illustrated embodiment, an expansible and collapsible vessel 24 charged with a thermosensitive volatile fluid has its movable end wall 25 provided with a stem 26 engaging the aforesaid operating member 16, shown as a lever pivotally supported by a bracket 27. While this primary thermostat may be mounted in any suitable position, the embodiment illustrated provides for its location in an air intake to the radiator housing, whereby this primary thermostat may be responsive to changes in the temperature of the air exterior of the housing without itself being positioned exteriorly thereof. To this end, the housing is shown as provided interiorly with a vertical partition 28, preferably of heat conducting material, and between said partition 28 and the end wall of the housing is a second partition 29, preferably of heat insulating material. A further partition of heat insulating material 30 extends between the end wall of the housing and the partition 28. The end wall of the housing is provided with apertures 31 for the admission of air, while the top of the housing is provided with apertures communicating with the space between the partitions 28 and 29. Thereby is provided two passages communicating at their lower end, whereby the air may flow through apertures 31, descend between the end wall of the housing and partition 29, and rise between partitions 28 and 29, the heat of the radiator transmitted through the partition 28 heating the air in the latter passage and maintaining the circulation. The primary thermostat may desirably be mounted on the aforesaid partition 29 as by the spider 32 which holds one end of the expansible and collapsible vessel 24 in fixed position. Bracket 27 may also be mounted on partition 29, and this partition may also be provided with a packing surrounding the link 15 where said link passes through the partition.

Means are also preferably provided for predetermining the initial temperature at which the primary thermostat begins to move the secondary thermostat with respect to the source of heat. To this end operating member 16 is shown as provided with a lateral arm 33 to which is connected a coil spring 34. Any suitable means may be employed for adjusting the tension of this spring, the illustrated embodiment comprising a block 35 fixedly connected with the end coils of the spring and adjustably mounted upon a threaded spindle 36 which may extend to an operating and indicating device positioned in or on the wall of the housing, as indicated at 37.

Figure 3:
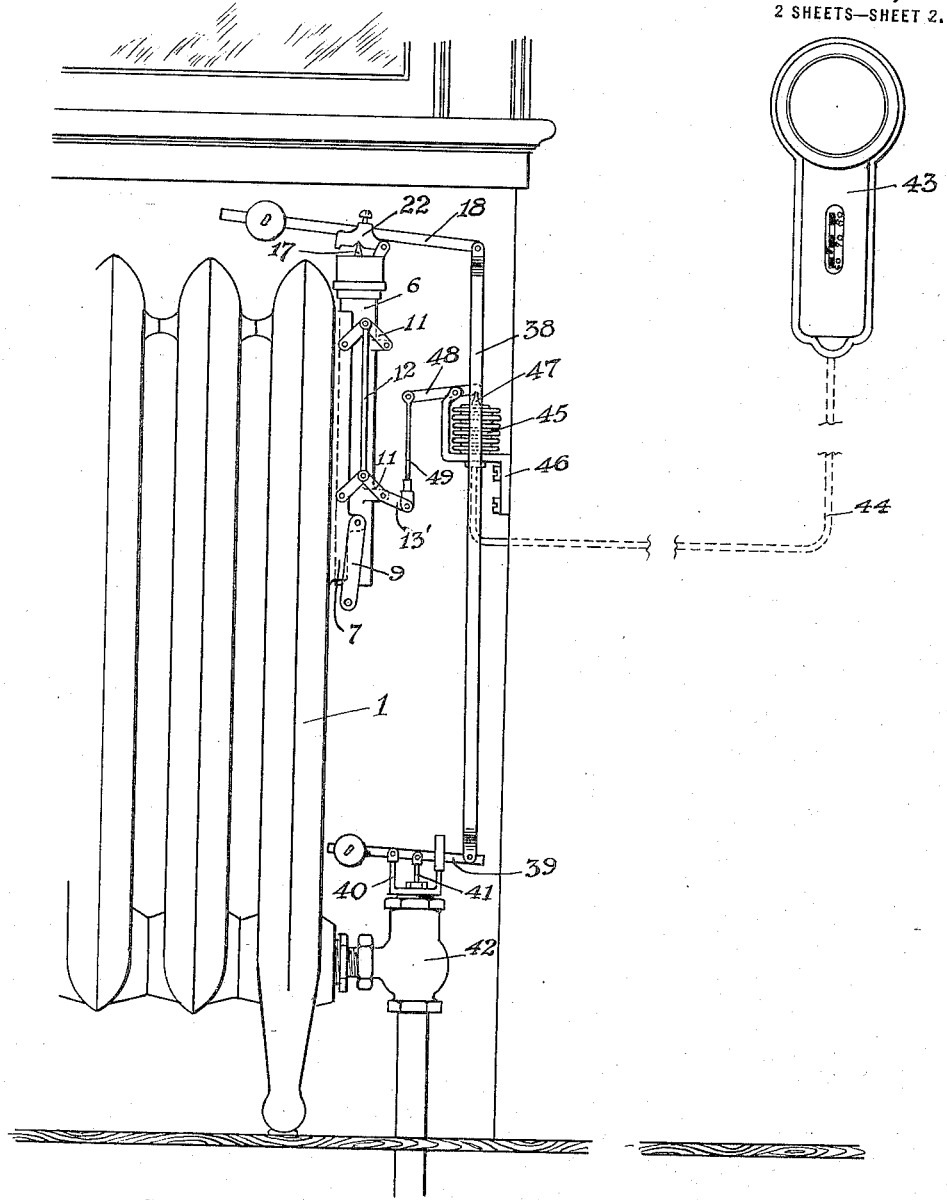
Fig. 3 is an elevation of an embodiment of the invention applied to the control of a valve for admitting a heating medium to a radiator.

In the embodiment of the invention shown in Fig. 3, the secondary thermostat is operatively connected to a valve for admitting a heating medium to a radiator. In this construction the secondary thermostat 6 is mounted for movement with respect to the radiator as has heretofore been described. The rocker member 22, in the form shown, is engaged by the stem 17 and carries adjustably with respect thereto, a weighted operating arm 18' with which is pivotally connected a link 38. The opposite end of this link 38 is pivotally connected to a weighted lever 39 mounted on a bracket 40 and operatively connected with the stem 41 of a valve positioned within the housing 42 and adapted to control the supply of heating medium to the radiator 1. The primary thermostat shown in this embodiment of the invention is of the general type disclosed in my Patent No. 1,186,180, granted June 6, 1916, wherein a thermosensitive member within the housing 43 transmits pressure through a fluid in the pipe 44 to the interior of an expansible and collapsible vessel 45 having a fixed end wall and a movable end wall operatively connected to the secondary thermostat. The vessel 45 may conveniently be mounted upon a bracket 46, and its movable end wall is shown as provided with a stem 47 operatively engaging a lever 48 connected by a link 49 to a crank-arm 13' constituting an extension of one of the elements of one of the toggles 11.

In operation, the primary thermosensitive means is responsive to temperature changes, such as changes of temperature in the air to be heated, and through its operating connections moves the secondary thermostat with respect to a source of heat as, in the illustrated embodiments, a radiator of the heating system. When the secondary thermostat is at one extremity of its range of movement it is in contact with the radiator or means connected therewith, and therefore is subjected to the full heat of the radiator. When at the opposite extremity of its range of movement, it is spaced from the radiator and cooled by the convectional currents of air produced thereby, wherefore there exists a considerable difference in the temperatures to which this thermostat is subjected, especially when it is movable bodily toward and away from the source of heat, though its range of movement be comparatively small. Thus it has been found by experiments that in a room heated to approximately 70°, and with steam used as a heating medium, the temperature to which the secondary thermostat is subjected when in contact with the radiator is approximately 200°, while the temperature to which it is subjected at the opposite end of its range of movement is from 80 to 90°. Consequently, a relatively small movement of the secondary thermostat produced by relatively small temperature changes at the primary thermostat will vary to a much greater extent the temperature changes to which the secondary thermostat is subjected, whereby a very material increase in power may be obtained for the actuation of a controlling means, such as the damper of the radiator housing, or the valve for the heating medium.

While the illustrated embodiments of this invention relate to the control of the heating effect of a radiator, it is to be expressly understood that the invention is not restricted to the control of a radiator, as the source of heat may equally well be a pipe through which a heating medium is passing, or in fact any one of a large variety of means constituting a source of heat, while the element operated by the secondary thermostat may be any suitable means to be controlled. While the primary thermostat has been illustrated as comprising an expansible and collapsible vessel, the contraction or expansion of which produces a movement of the secondary thermostat with respect to the source of heat, it is also to be expressly understood that any other suitable form of thermostat or other device may be employed as a primary actuating means.

What is claimed is:

1. In combination with a source of heat, means for controlling the same, a secondary thermostat operatively connected to said controlling means and mounted for movement toward and away from said source of heat, and a primary thermostat for moving said secondary thermostat.

2. In combination with a source of heat, means for controlling the same, thermosensitive means operatively related to said controlling means and movable relatively to said source of heat, and thermosensitive means operatively related to said first-mentioned thermosensitive means for moving the same with respect to said source of heat.

3. In combination with a source of heat, means for controlling the same, a secondary thermostat operatively connected to said controlling means and mounted for movement toward and away from said source of heat, a primary thermostat for moving said secondary thermostat, and means for predetermining the temperature at which said primary thermostat begins to move said secondary thermostat.

4. In combination with a source of heat, means for controlling the same, thermosensitive means operatively related to said controlling means and movable relatively to said source of heat, thermosensitive means operatively related to said first-mentioned thermosensitive means for moving the same with respect to said source of heat, and means for predetermining the initial temperature at which said last-mentioned thermosensitive means may move said first-mentioned thermosensitive means.

5. In combination with a source of heat, means for controlling the same, a secondary thermostat operatively related to said controlling means and movable toward and away from said source of heat, a primary thermostat operatively related to said secondary thermostat for moving the same relatively to said source of heat, a spring opposing movement of said secondary thermostat, and means for adjusting said spring.

6. In combination with a source of heat, means for controlling the same, thermosensitive means operatively related to said controlling means and movable relatively to said source of heat, thermosensitive means operatively related to said first-mentioned thermosensitive means for moving the same with respect to said source of heat, a spring controlling said last-mentioned thermosensitive means, and means for adjusting said spring.

7. In combination with a source of heat and means to be controlled, a thermostat operatively connected to said means to be controlled and mounted for movement toward and away from said source of heat, and temperature-responsive means for advancing and withdrawing said first-mentioned thermostat with respect to said source of heat to control first-mentioned means by the proximity of said thermostat to said source of heat.

8. In combination with a source of heat and means to be controlled, thermosensitive means operatively related to said means to be controlled and mounted for movement relatively to said source of heat, and thermosensitive means operatively related to said first-mentioned thermosensitive means for moving the same with respect to said source of heat.

9. In combination with a source of heat, a secondary thermostat mounted for movement toward and away from said source of heat and operatively related to means to be controlled, and a primary thermostat for moving the secondary thermostat.

10. In combination with a source of heat, thermosensitive means movable relatively to said source of heat and operatively related to means to be controlled, and thermosensitive means operatively related to said first-mentioned thermosensitive means for moving the same with respect to said source of heat.

11. In combination with a radiator, means for controlling the heating effect of said radiator, a secondary thermostat mounted for movement toward and away from said radiator and operatively connected to said controlling means, and a primary thermostat under the control of the temperature of the air and operatively connected to said secondary thermostat for moving the same.

12. In combination with a radiator, means for controlling the heating effect of said radiator, thermosensitive means movably mounted with respect to said radiator and operatively related to said controlling means, and thermosensitive means under the control of the temperature of the air and operatively related to said first-mentioned thermosensitive means for moving the same.

13. In combination with a radiator, means for controlling the heating effect of said radiator, a secondary thermostat mounted for movement toward and away from said radiator and operatively connected to said controlling means, a primary thermostat under the control of the temperature of the air and operatively connected to said secondary thermostat for moving the same, and means for predetermining the temperature at which said primary thermostat begins to move said secondary thermostat.

14. In combination with a radiator, means for controlling the heating effect of said radiator, thermosensitive means movably mounted with respect to said radiator and operatively related to said controlling means, thermosensitive means under the control of the temperature of the air and operatively related to said first-mentioned thermosensitive means for moving the same, and means for predetermining the initial temperature at which said last-mentioned thermosensitive means may move said first-mentioned thermosensitive means.

15. In combination with a radiator, means for controlling the heating effect of said radiator, thermosensitive means mounted for movement with respect to said radiator and operatively related to said controlling means, and temperature responsive means operatively related to said thermosensitive means for moving the same with respect to said radiator.

16. In combination with a radiator, means for controlling the heating effect of said radiator, a thermostat mounted for bodily movement toward and away from said radiator and operatively connected to said controlling means, and means operatively connected to said thermostat for advancing and withdrawing said thermostat toward and away from said radiator to control said first-mentioned means by the proximity of said thermostat to said radiator.

17. In combination with a radiator, means for controlling the heating effect of said radiator, a secondary thermostat mounted for movement toward and away from said radiator and operatively connected to said controlling means, a primary thermostat under the control of the temperature of the air and operatively connected to said secondary thermostat for moving the same, a spring opposing movement of said secondary thermostat, and means for adjusting said spring.

18. In combination with a radiator, means for controlling the heating effect of said radiator, thermosensitive means movably mounted with respect to said radiator and operatively related to said controlling means, thermosensitive means under the control of the temperature of the air and operatively related to said first-mentioned thermosensitive means for moving the same, a spring controlling said last-mentioned thermosensitive means, and means for adjusting said spring.

19. In combination with a radiator, a damper-controlled housing therefor, a secondary damper-controlling thermostat mounted for movement toward and away from said radiator, and a primary thermostat under the control of the temperature of the air and operatively connected to said secondary thermostat for moving the same.

20. In combination with a radiator, a damper-controlled housing therefor, a secondary damper-controlling thermostat mounted for movement toward and away from said radiator, and a primary thermostat positioned in an air-intake of said housing and operatively connected to said secondary thermostat for moving the same.

21. In combination with a radiator, a damper-controlled housing therefor, a secondary damper-controlling thermostat mounted for movement toward and away from said radiator, a primary thermostat under the control of the temperature of the air and operatively connected to said secondary thermostat for moving the same, and means for predetermining the temperature at which said primary thermostat begins to move said secondary thermostat.

22. In combination with a radiator, a damper-controlled housing therefor, a secondary damper-controlling thermostat mounted for movement toward and away from said radiator, a primary thermostat under the control of the temperature of the air and operatively connected to said secondary thermostat for moving the same, a spring opposing movement of said secondary thermostat, and means for adjusting said spring.

23. In combination with a source of heat and means to be controlled, thermosensitive means operatively connected to said means to be controlled and mounted for movement with respect to said source of heat, and thermosensitive means operatively connected to said first-mentioned thermosensitive means for moving the same with respect to said source of heat.

24. In combination with a radiator, a damper-controlled housing therefor, thermosensitive means operatively connected to said damper and mounted for bodily movement toward and away from said radiator, and means operatively connected to said thermosensitive means for moving the same bodily toward and away from said radiator to control said damper by the proximity of said thermostat to said radiator.

25. In combination with a source of heat and means to be controlled, thermosensitive means operatively connected to said means to be controlled and mounted for bodily movement toward and away from said source of heat and means for adjusting said thermosensitive means bodily toward and away from said source of heat to control said first-named means by the proximity of said thermosensitive means to said source of heat.

26. In combination with a source of heat and means to be controlled, thermosensitive means operatively connected to said means to be controlled and movable bodily with respect to said source of heat, and temperature-responsive means for moving said thermosensitive means bodily with respect to said source of heat.

In testimony whereof I have signed this specification.

WESTON M. FULTON.